United States Patent [19]
Hilton

[11] Patent Number: 5,752,468
[45] Date of Patent: May 19, 1998

[54] DECORATIVE AQUARIUM SCREEN

[76] Inventor: Corey Hilton, 1409 Roper Mountain Rd. Apt. #297, Greenville, S.C. 29615

[21] Appl. No.: 786,898

[22] Filed: Jan. 23, 1997

[51] Int. Cl.$^6$ ............................................. A01K 63/00
[52] U.S. Cl. ............................................. 119/253
[58] Field of Search ........................ 119/253, 269, 119/247, 257, 245; D30/101, 102, 103, 104, 106

[56] References Cited

U.S. PATENT DOCUMENTS

| | | | |
|---|---|---|---|
| D. 326,934 | 6/1992 | Waters | D30/101 |
| 1,723,272 | 8/1929 | Emma | 119/247 X |
| 1,777,944 | 10/1930 | Trovato | 119/257 X |
| 1,974,068 | 9/1934 | Greensaft | 119/257 |
| 2,293,612 | 8/1942 | Montague | 119/247 X |
| 2,595,085 | 4/1952 | Kuriyama | 119/253 X |
| 3,276,428 | 10/1966 | Burch | 119/257 |
| 3,991,715 | 11/1976 | Gibson | 119/249 |
| 4,078,522 | 3/1978 | Akers | 119/266 |
| 4,136,638 | 1/1979 | Fedor | 119/257 |
| 4,353,327 | 10/1982 | Shroyer | 119/257 |
| 5,189,982 | 3/1993 | Liu | 119/247 |
| 5,263,772 | 11/1993 | Ritzow | 119/247 X |

*Primary Examiner*—John J. Wilson
*Assistant Examiner*—Yvonne R. Abbott

[57] ABSTRACT

An aquarium screen (10) is provided for an aquarium tank (14). The screen is supported in front of the aquarium tank and conceals the tank frame, edges, and equipment from view to give the viewer a greater increase in viewing enjoyment by increasing the aesthetic appeal of the aquarium tank.

5 Claims, 8 Drawing Sheets

DECORATIVE AQUARIUM SCREEN

BACKGROUND

1. Field of Invention

This invention relates to improvements in aquariums, specifically to a decorative screen for an aquarium tank.

2. Description of Prior Art

Currently an aquarium tank sits on a separate base. Together the aquarium tank and separate base represent an economical solution for owning an aquarium setup for the home, office, commercial, and other uses. However, this combination can lack aesthetic appeal and visual interest because the standard aquarium tank is essentially a utilitarian item of a simple, box shape. Therefore, designer aquariums have been developed to improve the visual interest of the aquarium setup. For example, U.S. Pat. No. 5,189,982 to Liu (1993) discloses a decorative aquarium in combination with a table. Although this invention, and other designer aquariums, are successful in providing more visual appeal than a box-shaped, glass tank on a pedestal base, they are much more expensive than the tank/base combination.

Also, several inventions have been developed to add interest to the aquarium tank and base duo. U.S. Pat. No. 4,078,522 to Akers (1978) discloses a decorative three dimensional aquarium cover. In a similar spirit, U.S. Pat. No. 3,991,715 to Gibson (1976) discloses an attachment for an aquarium tank. Both inventions are successful in adding a little interest to the aquarium tank; however, the tank essentially remains a plain box.

U.S. Pat. Nos. 5,263,772 to All Glass Aquarium Co. (1993) and D326,934 to Oceanic Systems, Inc. (1992) are examples that add a canopy top and a cabinet style base to the aquarium tank. The canopy and cabinet base are attractive items, but they still leave the frame and edges of the tank visible, distracting the viewer from the aquatic world inside the tank.

OBJECTS AND ADVANTAGES

Accordingly, several objects and advantages of my invention are:

(a) to provide an increase in aesthetic appeal and visual interest of an aquarium tank;

(b) to turn a box-shaped aquarium tank into an attractive, sculptural item in an economical manner;

(c) to give the illusion that a standard aquarium tank is of a custom design;

(d) to attractively obscure the tank frame, edges, and necessary tank equipment from sight to give the viewer less distractions in enjoying the view of the aquarium.

DRAWING FIGURES

Figure 1:
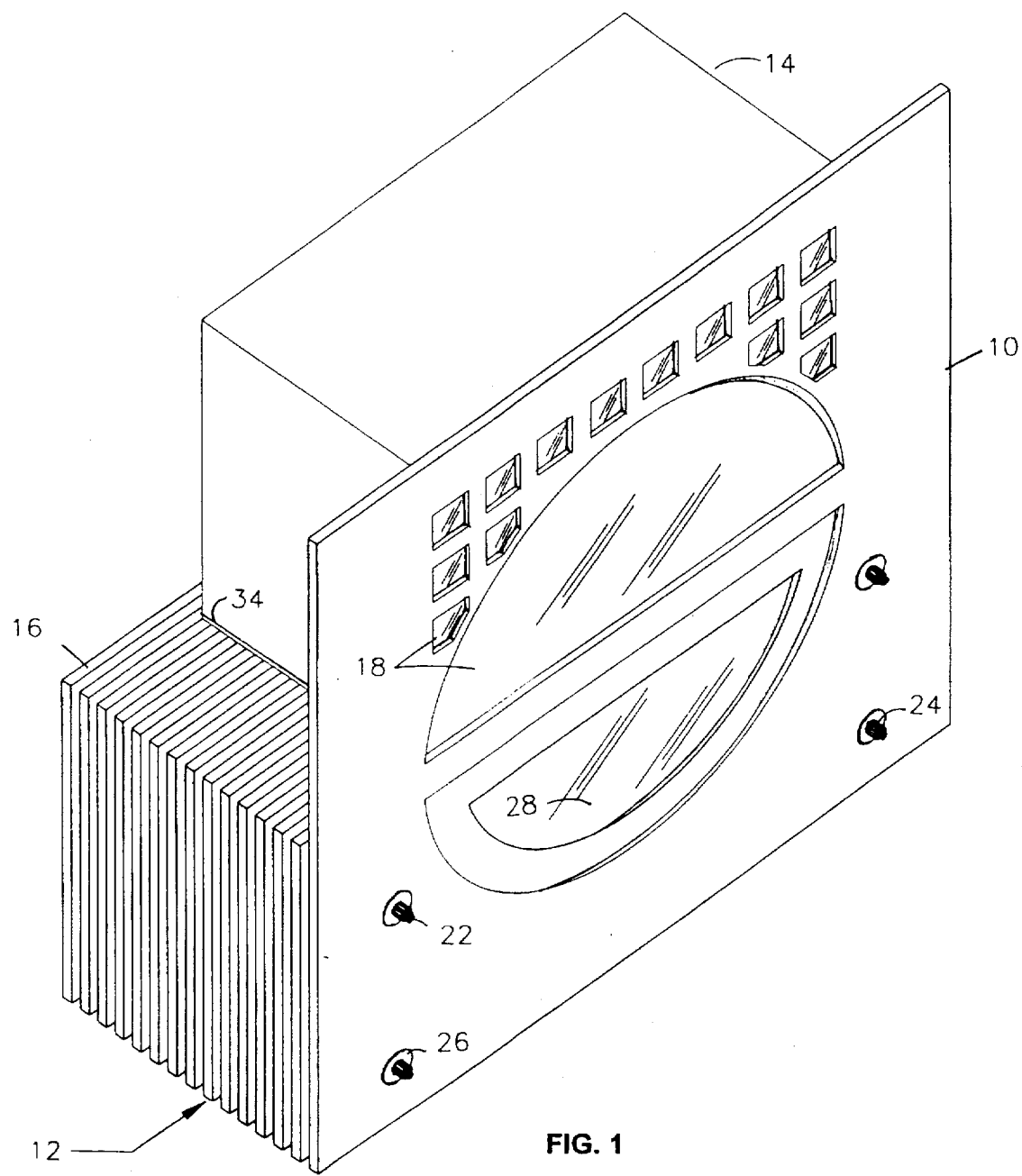
FIG. 1 is a three dimensional, axonometric view of the aquarium screen, base, and aquarium tank.
Figure 1A:
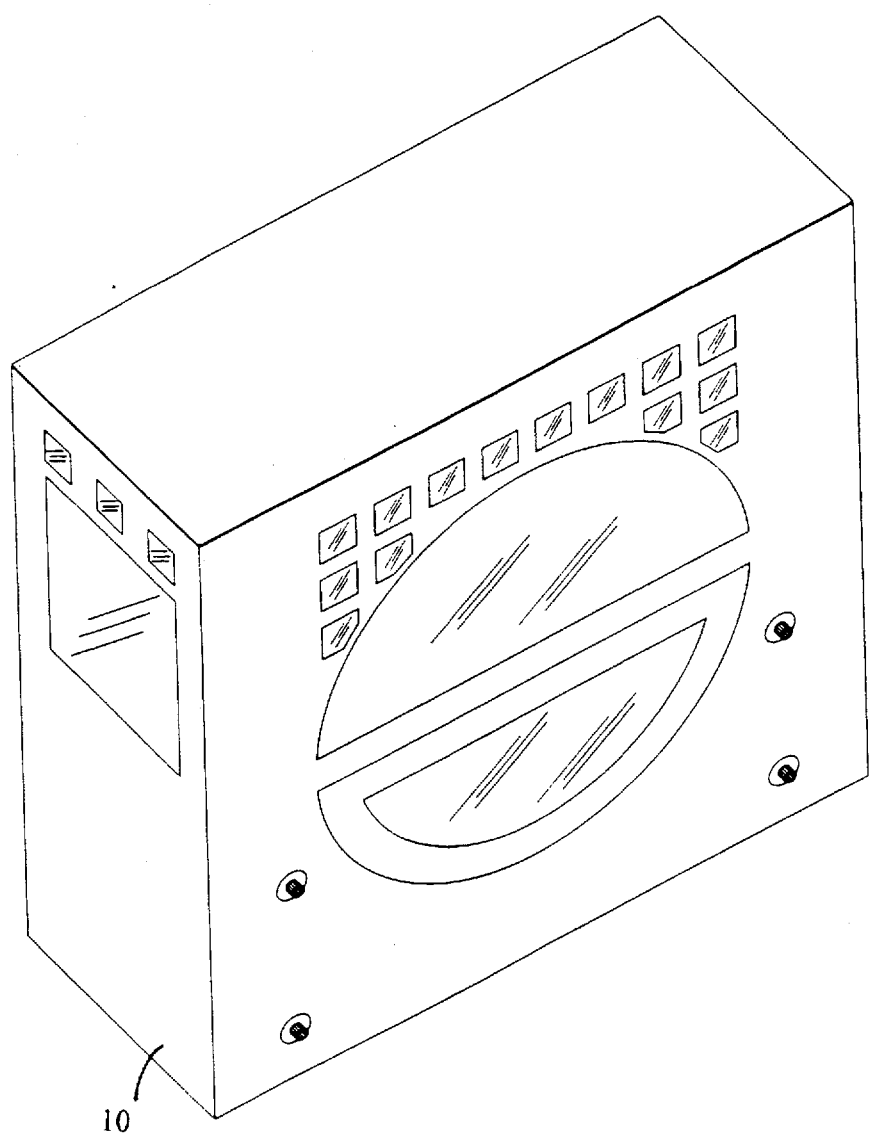

| Reference Numerals in Drawings | |
| --- | --- |
| 10 aquarium screen | 12 base |
| 14 aquarium tank | 16 base supports |
| 18 view openings | 22 threaded rods |
| 24 nuts for rods | 26 washers |
| 28 transparent material | 30 bolts |
| 32 nuts for bolts | 34 tank platform |

DESCRIPTION—FIGS. 1 TO 5

FIG. 1 shows an axonometric view of an aquarium screen 10, a base 12, and an aquarium tank 14. The base 12 is composed of a plurality of equally spaced vertical planes of rigid material, or base supports 16. The aquarium tank 14 sits upon the base 12. The decorative screen 10, supported by the base 12, is a vertical plane of rigid material with a plurality of openings, or view openings 18 of varying sizes and shapes.

Figure 2:
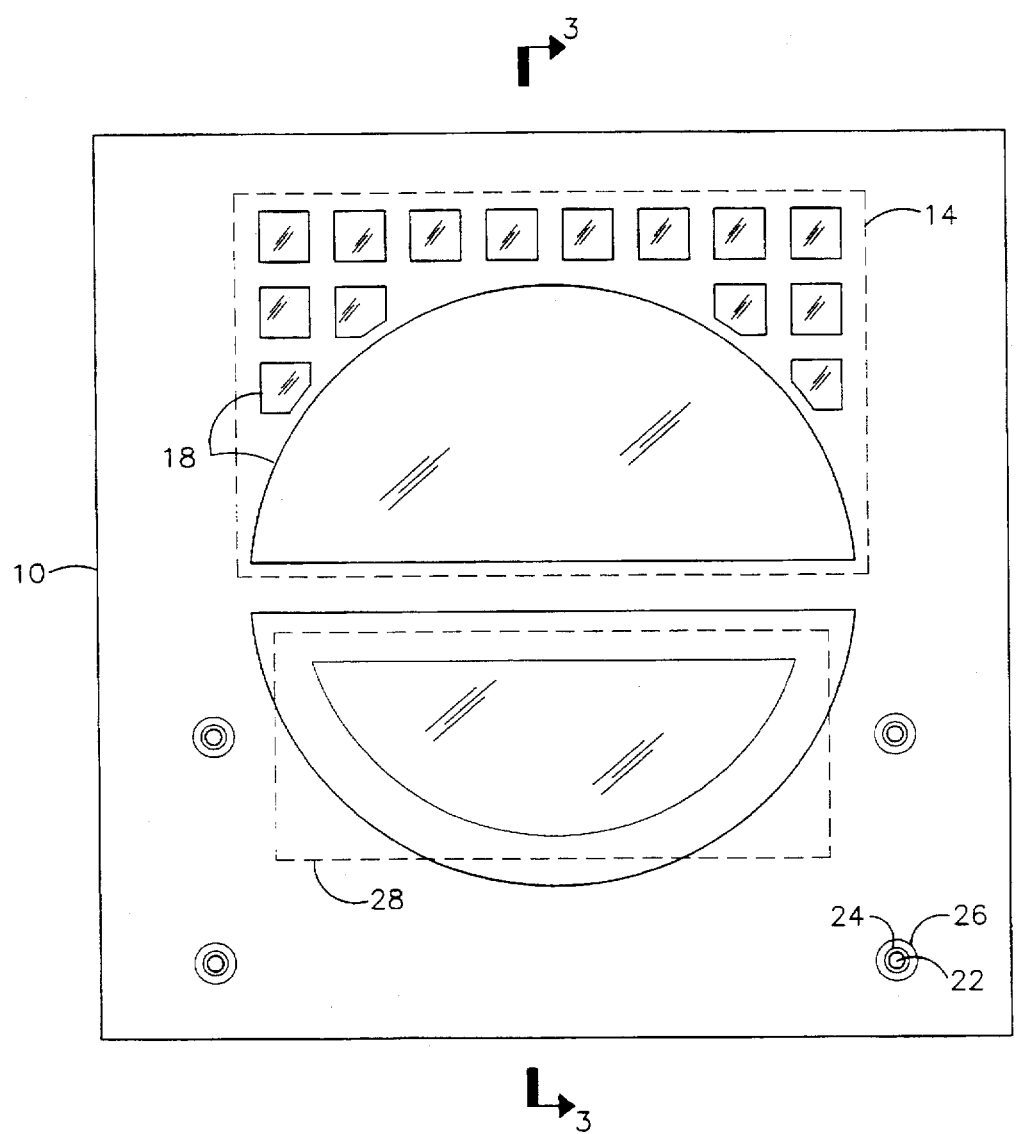
FIG. 2 is a front elevational view of the aquarium screen.

FIG. 2 shows a front elevational view of the aquarium screen 10. The view openings 18 of the screen reveal appealing views into the aquarium tank while the screen obscures the frame and edges of the tank and the tank equipment (such as the heater, filter, etc.) from the viewer. This hiding of the tank frame and equipment gives a pleasing sculptural view of the fish and decorations within the tank.

Figure 3:
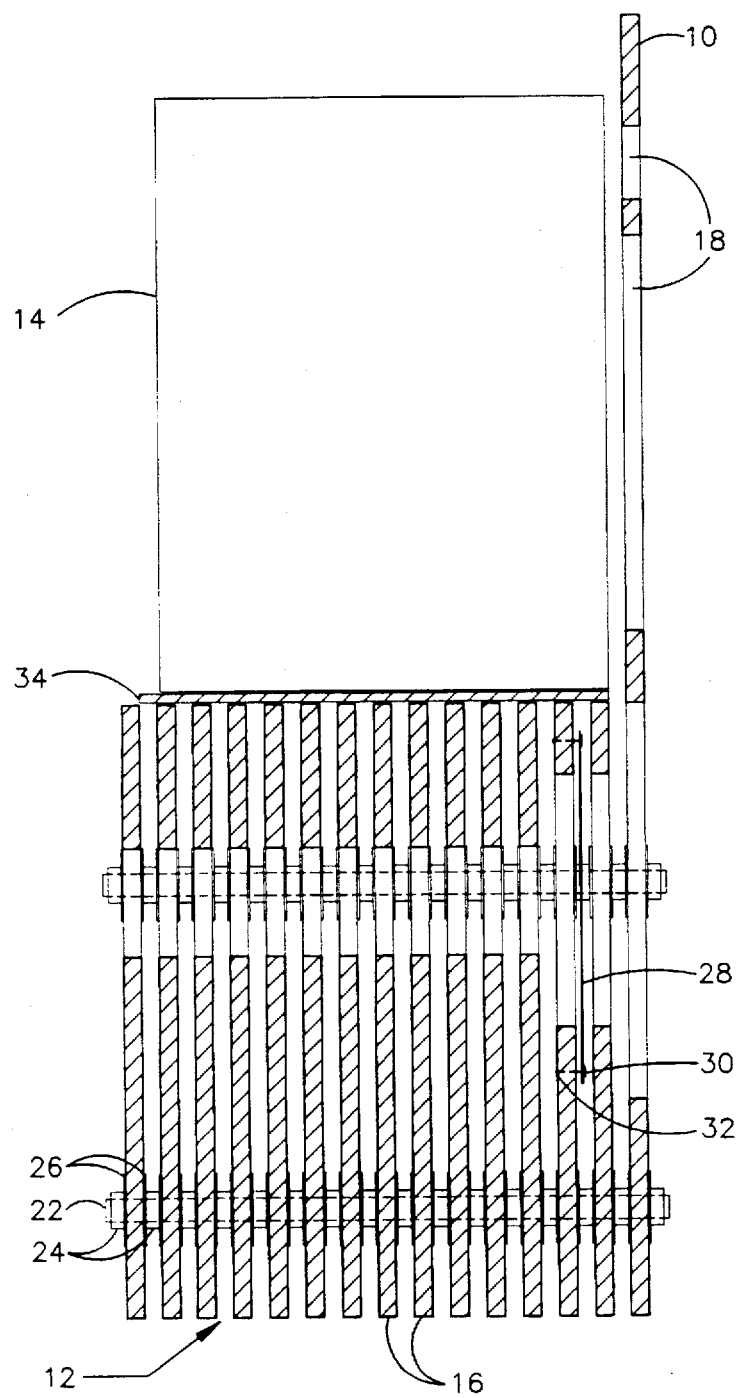
FIG. 3 is a sectional view indicated by line 3—3 in FIGS. 2 and 4.
Figure 3A:
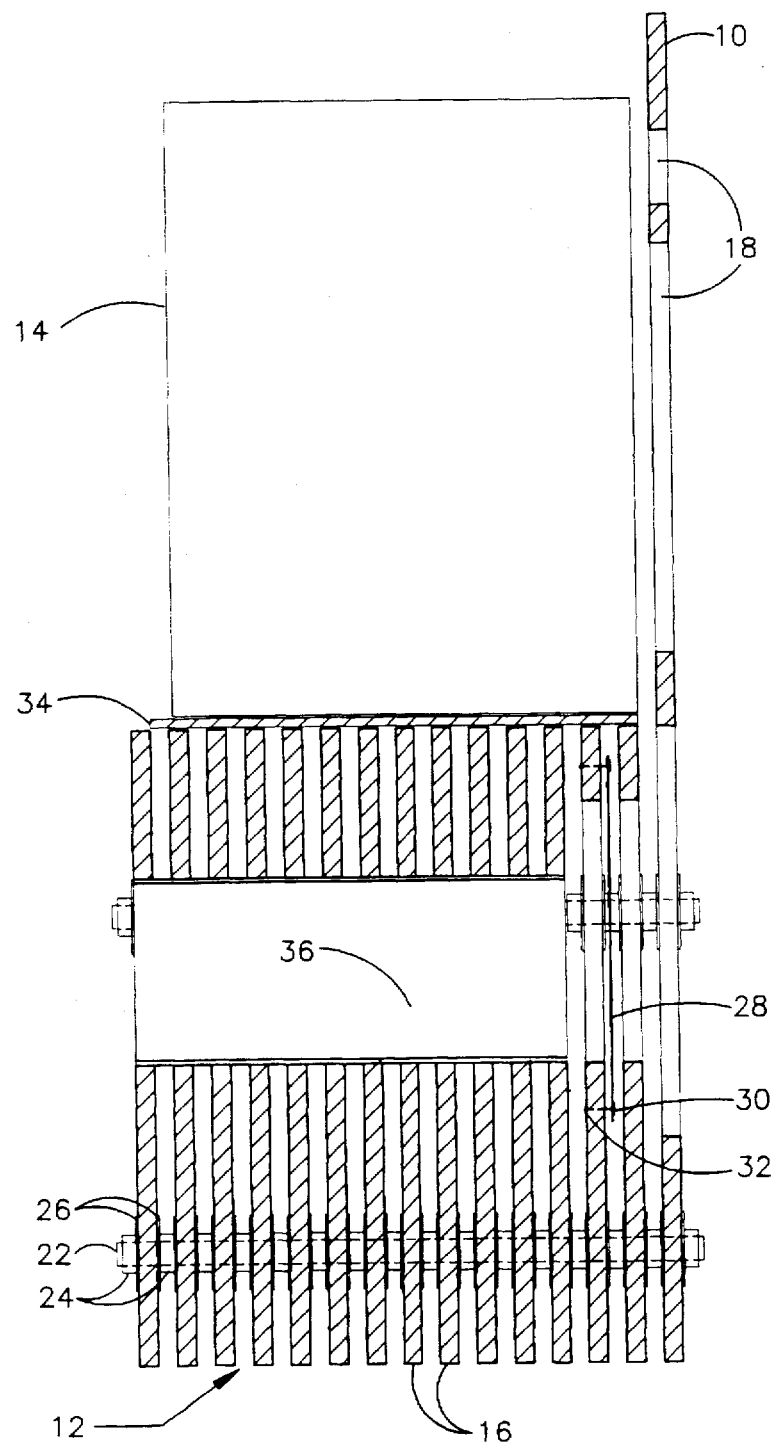
Figure 3B:
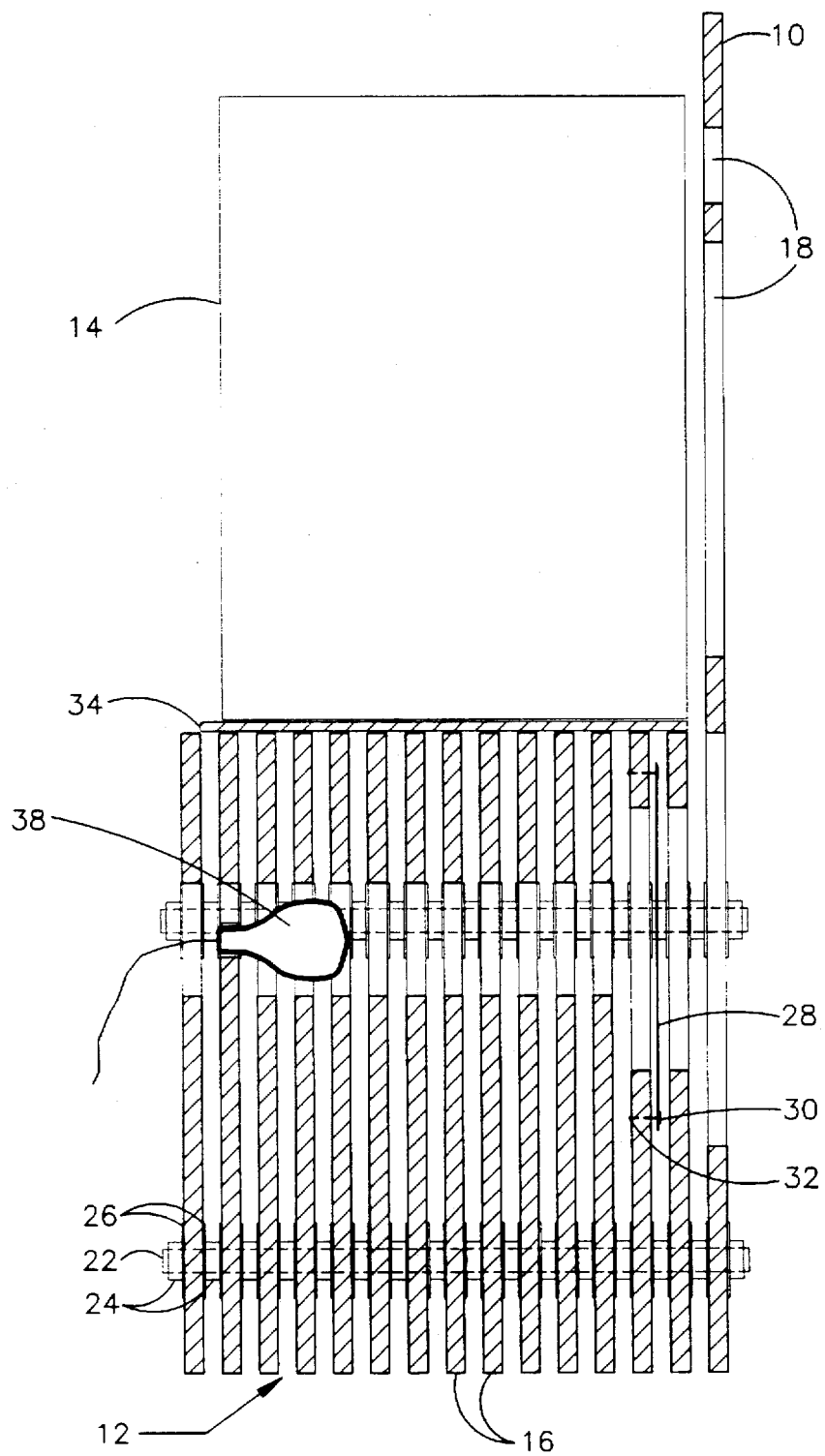
Figure 4:
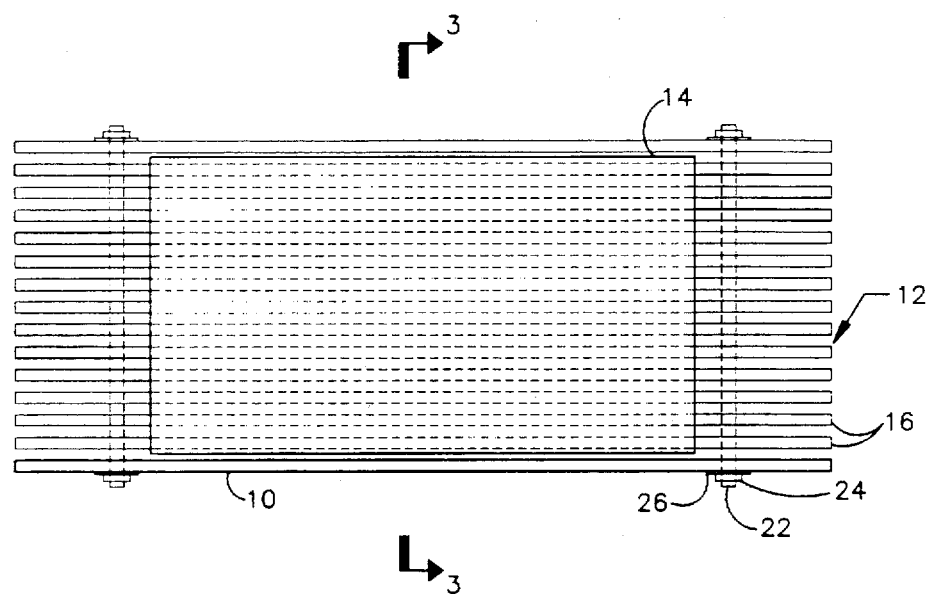
FIG. 4 is a top plan view of the screen, base, and tank.

FIG. 3 shows a vertical sectional view of the screen and base along section line 3—3 indicated in FIGS. 2 and 4. FIG. 3 shows the base supports 16 that hold up the aquarium tank 14. The base supports 16 are a plurality of vertical planes held up by threaded rods 22, nuts for rods 24, and washers 26. Each base support 16 is held securely on the threaded rods 22 by the washer and the nut placed on either side of the base support 16 along the threaded rods. The placement of the nuts and washers hold the base support 16 rigidly in equal spaces along the threaded rods.

Each base support 16 has a view opening 18. A sheet of transparent material 28 is attached to one of the base supports 16 by bolts 30 and nuts for bolts 32. The view openings and transparent material create an interesting sculptural effect.

A horizontal plane of rigid material or tank platform 34 sits upon the base supports 16. The tank platform is the same size as the aquarium tank 14 bottom. The purpose of the platform is to distribute the tank loads to the base supports 16.

FIG. 4 shows a plan view of the screen 10, base 12, and tank 14 from the top view. This view shows the relationship of the tank 14 behind the screen 10 and the threaded rods 22 below.

Figure 5:
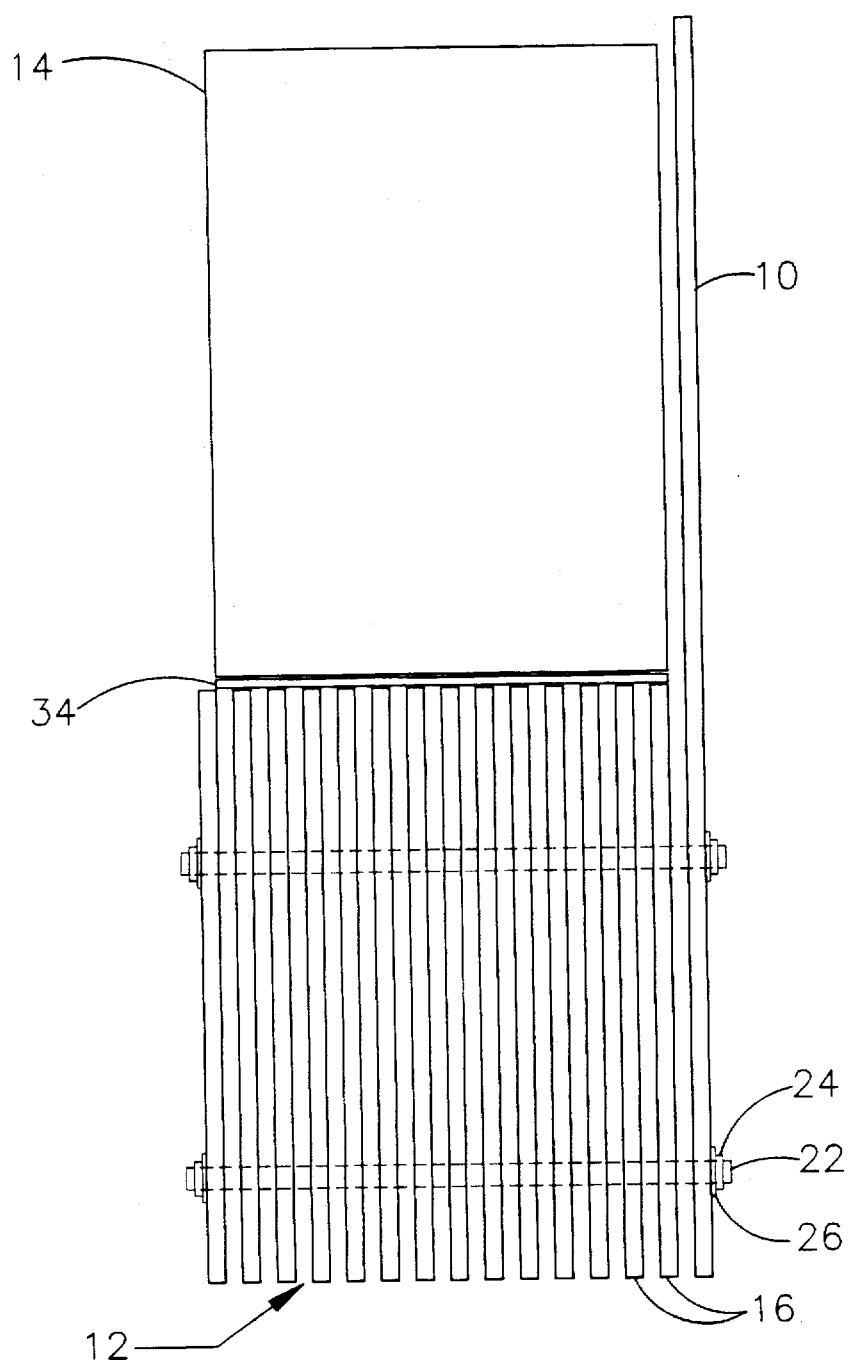
FIG. 5 is a right side elevational view, with the left side being a mirror image.

FIG. 5 shows a right elevational view with the left elevation being a mirror image. The view shows the relationship of the screen 10 to the tank 14, base 12, tank platform 34, and threaded rods 22.

SUMMARY, RAMIFICATIONS, AND SCOPE

The reader will see that the present invention provides an economical increase in aesthetic appeal and visual interest to a typical aquarium tank and base arrangement. While my above description contains many specifications, these should not be construed as limitations on the scope of the invention, but rather as an exemplification of one embodiment thereof. Many other variations are possible. For example, the proportions of the screen can be adjusted for tanks of different, sizes, shapes and proportions;

numerous patterns and configurations of the view openings can be made to get another desired sculptural effect;

the screen can be constructed in a lattice type manner or of different materials, including fabrics, plastics, woods, metals, etc.;

the screen can be attached directly to a tank or to an existing base via clips, hinges, etc.;

the screen can be extended to cover the sides, top, back, etc. of the tank;

cabinets, shelving, storage, etc. can be incorporated in the base in conjunction with the screen;

the base can be of a simple box construction rather than the plurality of vertical planes illustrated; and decorative lighting can be incorporated in the base and screen.

Accordingly, the scope of the invention should be determined not by the embodiments illustrated, but by the appended claims and their legal equivalents.

I claim:

1. A device for disguising an aquarium tank and equipment, comprising a screen with one or more openings to allow viewing of said aquarium tank; a base for supporting said aquarium tank and said screen; means for joining said screen to said base so as to support said screen vertically in front of said aquarium tank, wherein said one or more openings of said screen is large and sculptural in configuration, and wherein said base includes a plurality of vertical sheets joined together.

2. The device of claim 1 wherein said screen extends to cover top, sides, and back of said tank and base.

3. The device of claim 1 wherein said device includes storage means.

4. The device of claim 1 wherein electric lighting is incorporated with said device.

5. A device for disguising an aquarium tank and equipment, comprising a screen with one or more openings to allow viewing of said aquarium tank, wherein said device includes means to attach said screen to an existing base for said aquarium tank, wherein said one or more openings of said screen is large and sculptural in configuration.

* * * * *